United States Patent
Dougherty

(10) Patent No.: US 6,545,849 B1
(45) Date of Patent: Apr. 8, 2003

(54) INSTANTANEOUS FAULT DETECTION CIRCUIT METHOD AND APPARATUS

(75) Inventor: John J. Dougherty, Collegeville, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/467,744

(22) Filed: Dec. 20, 1999

(51) Int. Cl.⁷ .............................. H02H 3/08; H02H 9/02
(52) U.S. Cl. ...................... 361/93.2; 361/93.1; 361/93.6
(58) Field of Search ............................... 361/93.2, 93.1, 361/93.6; 702/58, 66; 700/292; 324/76.12, 76.13

(56) References Cited

U.S. PATENT DOCUMENTS

| | | | |
|---|---|---|---|
| 4,377,836 A | * | 3/1983 | Elms et al. ................... 361/44 |
| 4,443,854 A | * | 4/1984 | Pflanz et al. ................. 364/483 |
| 4,597,025 A | * | 6/1986 | Rutchik et al. ............... 361/94 |
| 4,717,985 A | * | 1/1988 | Demeyer ...................... 361/42 |
| 5,136,459 A | * | 8/1992 | Fararooy ..................... 361/93 |
| 5,963,406 A | * | 10/1999 | Neiger et al. ................. 361/42 |

* cited by examiner

Primary Examiner—Stephen W. Jackson
Assistant Examiner—Z Kitov
(74) Attorney, Agent, or Firm—Cantor Colburn LLP

(57) ABSTRACT

An algorithmic system for an electronic trip unit is provided whereby reliable instantaneous protection is provided. A multi-algorithmic approach uses an algorithm to detect bolted faults based on a direct comparison of the current and a threshold value, and an additional algorithm to detect current overloads based on a comparison of a peak-to-peak current and an additional current threshold.

23 Claims, 4 Drawing Sheets

INSTANTANEOUS FAULT DETECTION CIRCUIT METHOD AND APPARATUS

BACKGROUND OF THE INVENTION

The present invention relates generally to electronic trip units for circuit breakers and more particularly to electronic trip units providing instantaneous fault detection for circuit breakers.

Electronic trip units are well known. Electronic trip units typically comprise voltage and current sensors that provide analog signals indicative of the power line signals. The analog signals are converted by an A/D (analog/digital) converter to digital signals which are processed by a microcontroller. The trip unit further includes RAM (random access memory), ROM (read only memory) and EEPROM (electronic erasable programmable read only memory) all of which interface with the microcontroller. The ROM includes trip unit application code, e.g., main functionality firmware, including initializing parameters, and boot code. The EEPROM includes operational parameters for the application code.

These trip units are required to meet certain standards, e.g., UL/ANSI/IEC, which define trip time curves specifying under what conditions a trip must occur, i.e., short time, long time, instantaneous, or ground fault, all of which are well known. These standards also specify a short time delay from the instant power is applied to when a trip unit must be ready to trip.

The present invention is being directed to the instantaneous trip condition. Various electronic circuits (analog electronics) and customized integrated circuits (application specific integrated circuit (ASIC)) have been employed to perform instantaneous protection. Conventional low voltage electronic trip units have used a simple comparison to detect instantaneous trip conditions. This type of circuit compares the instantaneous current with a fixed threshold, and upon attainment of that threshold the electronic trip unit will trigger the breaker to open. Due to well-known load transients such as motor inrush, this approach almost always overprotects and results in nuisance tripping.

Further, because of a transient phenomenon known as asymmetry, the first half-cycle can theoretically appear to reach two times the motor inrush current, or sixteen times the normal operational current. Nonetheless, various industry standards and code requirements determine instantaneous set points at which level the breaker is required to trip.

Under conditions of asymmetry, the actual peak current that occurs is a function of the closing angle and impedance (X/R) of the line/load combination. Asymmetry also may occur in fault transients. For example a fault of ten times the rated current for a circuit breaker can theoretically appear to be twenty times the rated current for a particular half cycle. Light impedance (X/R) again limits this theoretical maximum to 1.7 to 1.9 times the steady state current. As such, using the conventional electronic comparison approach, in a feeder breaker system, both breakers will trip rather than only the breaker closest to the load. This problem may be alleviated by employing a peak-to-peak current comparison.

Peak-to-peak current comparisons are known in the field of protective relays for protection of high voltage loads. For example, protection relays sold by General Electric Company as model numbers DFP-100, DFP-200 and F30 employ algorithms using peak-to-peak current values. However, such protective relays are generally standalone or rack mounted devices installed physically separate from the circuit breaker. Furthermore, by virtue of being installed separately, they are generally not self-powered and are energized prior to the breaker or load being energized. Consequently, the protective relay begins sampling prior to breaker closing and properly records zero current as the level prior to current flow. With electronic trip units, this generally does not occur, because when the breaker is closed, current generally flows simultaneously to the load and to the electronic trip unit. The present invention provides a method and apparatus for protecting the load from instantaneous, or bolted, current overloads based on peak-to-peak current values for this simultaneous current flow while minimizing the existing problem nuisance tripping due to load transients.

SUMMARY OF THE INVENTION

The above-discussed and other drawbacks and deficiencies of the prior art are overcome or alleviated by the method and apparatus of the present invention. The algorithmic approach provides protection to electrical systems by detecting true electrical spikes, and further by accurately determining when current overloads are present.

The electronic trip unit of the present invention is particularly well suited for use in a selective breaker system. The selective system may comprise, for example, a current source, an upstream circuit breaker and trip unit, a plurality of downstream circuit breakers and trip units and corresponding loads. The downstream circuit breakers and trip units are rated to meet the demands of the corresponding loads and are said to trip at lower peaks as compared to the upstream circuit breakers and trip units. The circuit breaker trip unit includes a current transformer providing an input current to a rectifying means, whereupon said input currents are detected for a certain polarity and converted to a low level voltage signal for processing. The low-level voltage signals are then processed via a signal processor where the signals are acted upon by a series of algorithms. In one embodiment, the processing means comprises an analog-to-digital converter and a microprocessor. If certain conditions of the algorithms are met, communications with an actuator by, for example, an output signal will energize a trip solenoid, which will cause the contacts of the breaker device to open.

In a preferred embodiment, the algorithmic arrangement is a set of algorithms, which can be briefly described by the following two-step sequences:

Step 1: Compare the absolute value of the current signal with a value equal to two multiplied by the square root of two multiplied by the instantaneous set point; if the current value is greater for N consecutive samples, trip the circuit breaker; if not, proceed to Step 2;

Step 2: Obtain the values of the peak-to-peak current and compare to a value equal to two multiplied by the square root of two multiplied by the RMS instantaneous set point; if the peak-to-peak current is greater, trip the circuit breaker; if not, return to Step 1.

The above-discussed and other features and advantages of the present invention will be appreciated and understood by those skilled in the art from the detailed description and drawings that follow.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
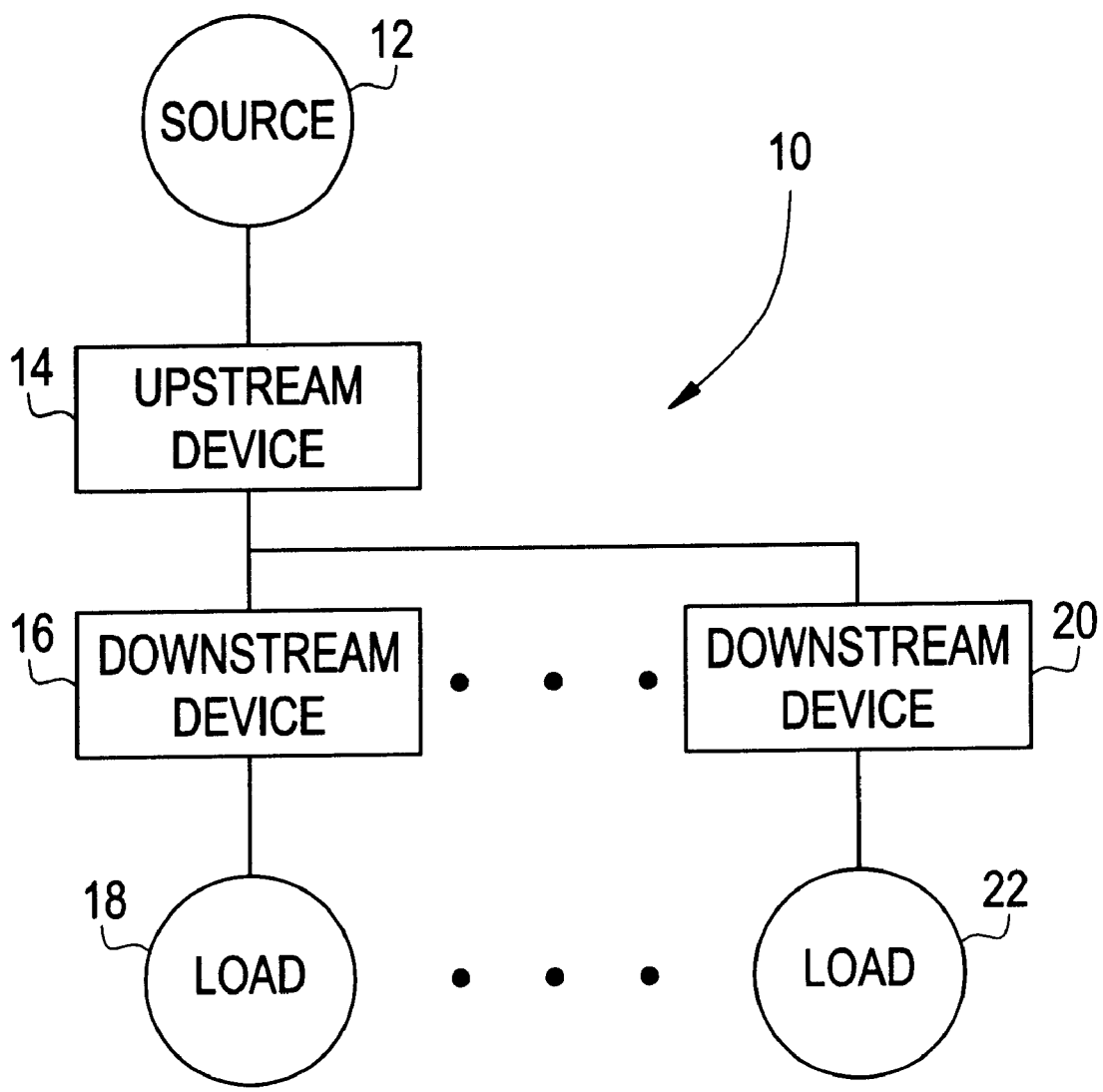
FIG. 1 is a schematic block diagram of a selective circuit trip system.

Referring to FIG. 1, a selective system is generally shown at 10. Selective system 10 comprises a source 12, an upstream device (circuit breaker and trip unit) 14, a downstream device (circuit breaker and trip unit) 16, and at least one corresponding load 18. Any number of additional downstream devices (circuit breakers and trip units) 20, with corresponding loads 22 may be included. The downstream devices 16, 20 are rated to meet the demands of the corresponding loads 18, 22 and are set to trip as described hereinafter. The upstream device 14 is rated to meet the demands of the system and is also set to trip as described hereinafter.

Figure 2:
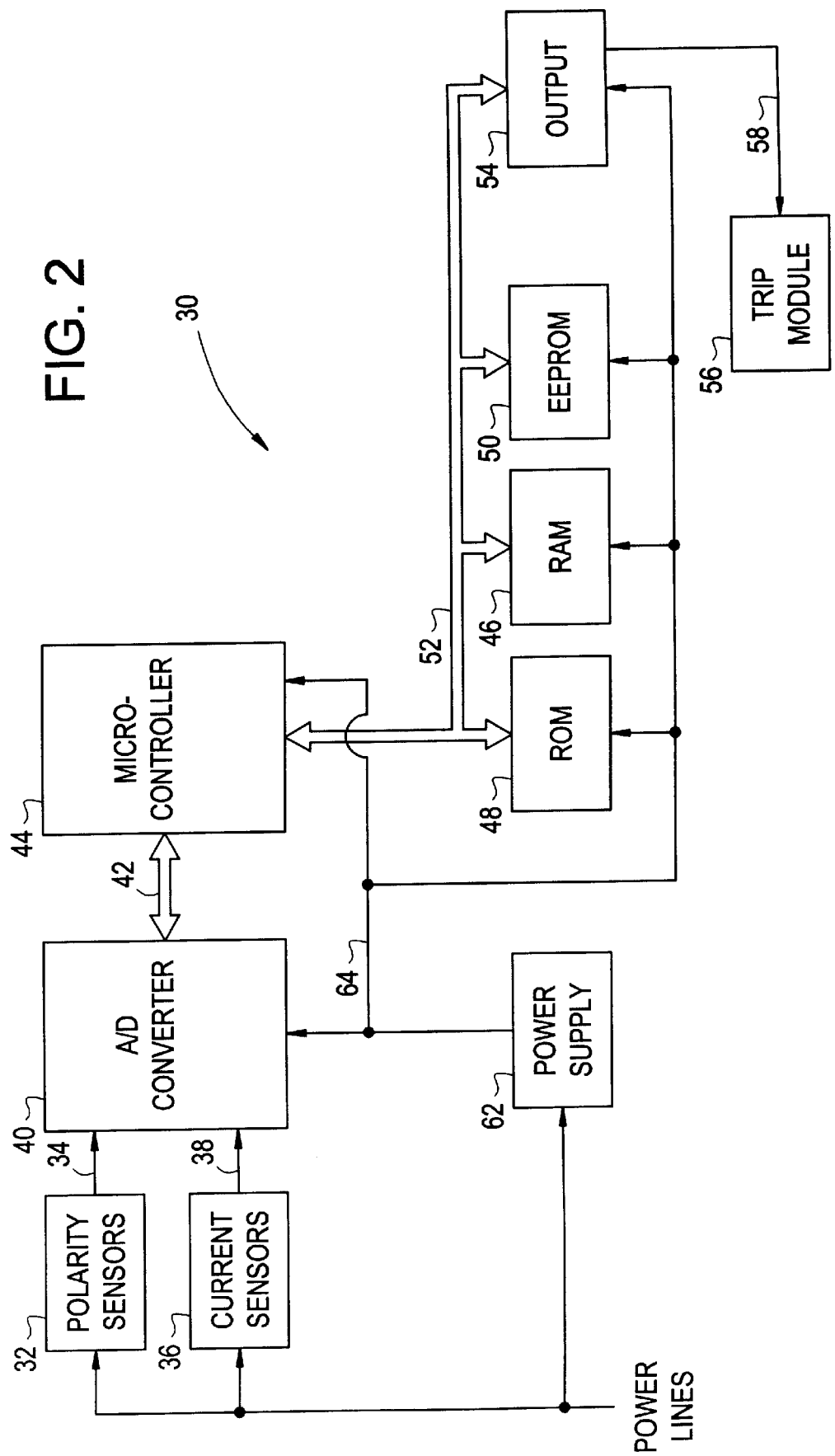
FIG. 2 is a schematic block diagram of an electronic trip unit.

Referring now to FIG. 2, a general schematic of a trip unit is shown at 30. The dual algorithm approach described hereinafter is preferably applied independently upon each phase current protected by the circuit breaker. Trip unit 30 comprises a polarity sensor 32, which provides analog signals indicative of polarity status of power line signals on a signal line 34, and a current sensor 36, which provides analog signals indicative of a current measurement of power line signals on a signal line 38. The analog signals on lines 34 and 38 are manipulated by an analog/digital (A/D) converter 40, which converts these analog signals to digital signals. The digital signals are presented over a bus 42 to a signal processor or microcontroller 44, such as one commercially available from Hitachi (i.e., HA/300 family of microcontrollers). Microcontroller 44 communicates with a random access memory (RAM) 46, a read only memory (ROM) 48 and an electronic erasable programmable read only memory (EEPROM) 50 over a control bus 52. The analog/digital converter 40, ROM 48, RAM 46 and EEPROM 50, or any combination thereof, may be internal to microcontroller 44, as is well known in the art. EEPROM 50 is preferably non-volatile so that system information and programming will not be lost during a power interruption or outage. An output control device 54 receives control signals from microcontroller 44 over control bus 52. Control device 54 controls a trip module 56 via a line 58. A power supply 62, which is powered by the service electricity, provides appropriate operational power over a line 64 to the components of trip unit 30. Alternatively, polarity sensor 32 and current sensor 36 are powered directly by the power lines. ROM 48 includes trip unit application code or algorithms, which are mainly functionality firmware including initializing parameters and boot code. The application code includes code for the algorithmic approach of the present invention. EEPROM 50 includes operational parameter code, such as code for setting the number of peaks for a trip or the sensitivity of the trip unit. These parameters will typically be stored in the trip unit at the factory and are selected to meet customers' requirements, but may be configured based on the customer needs as is well known in the art.

Figure 3A:
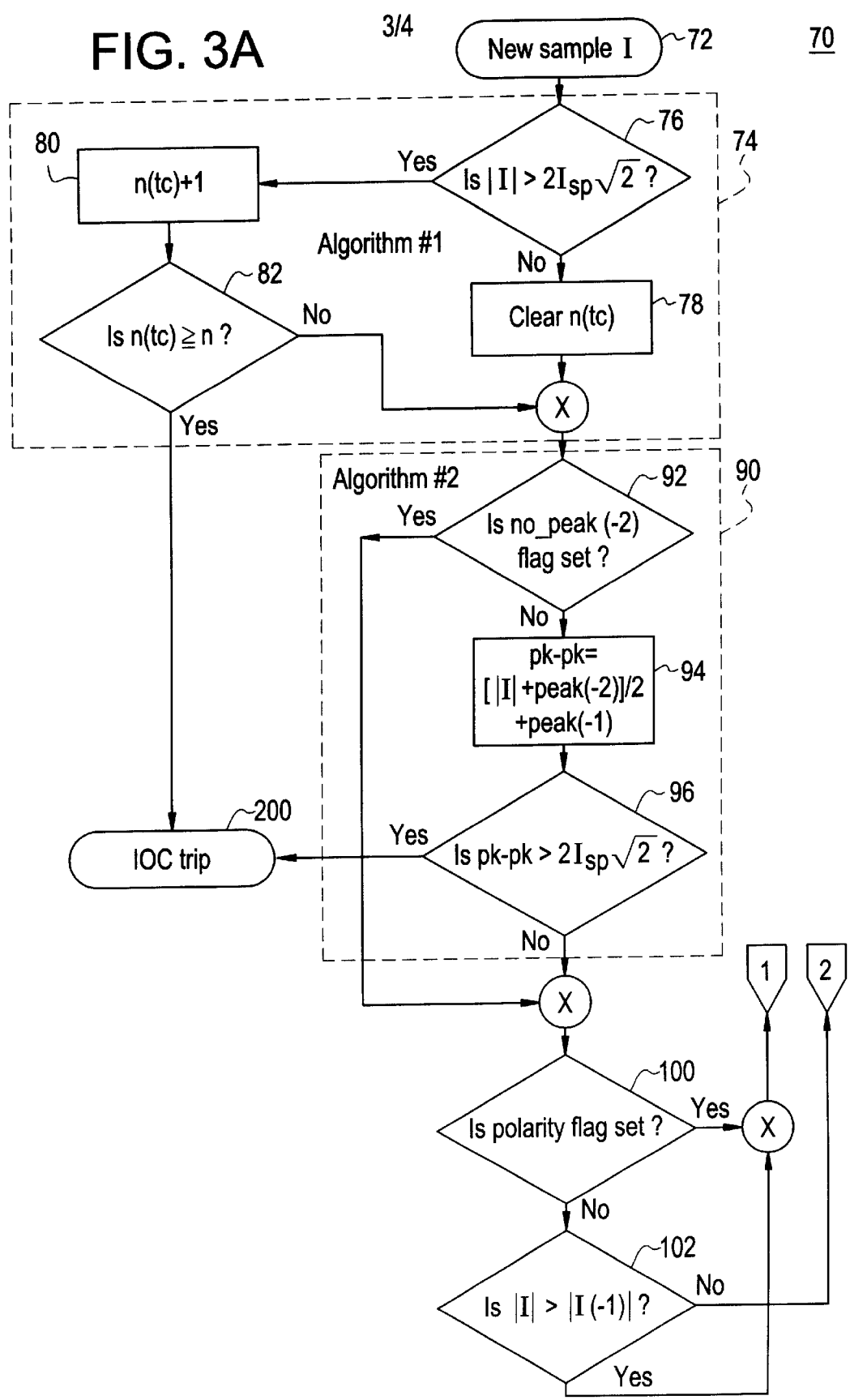
FIG. 3 is a flow diagram of the algorithmic procedure of the present invention.
Figure 3B:
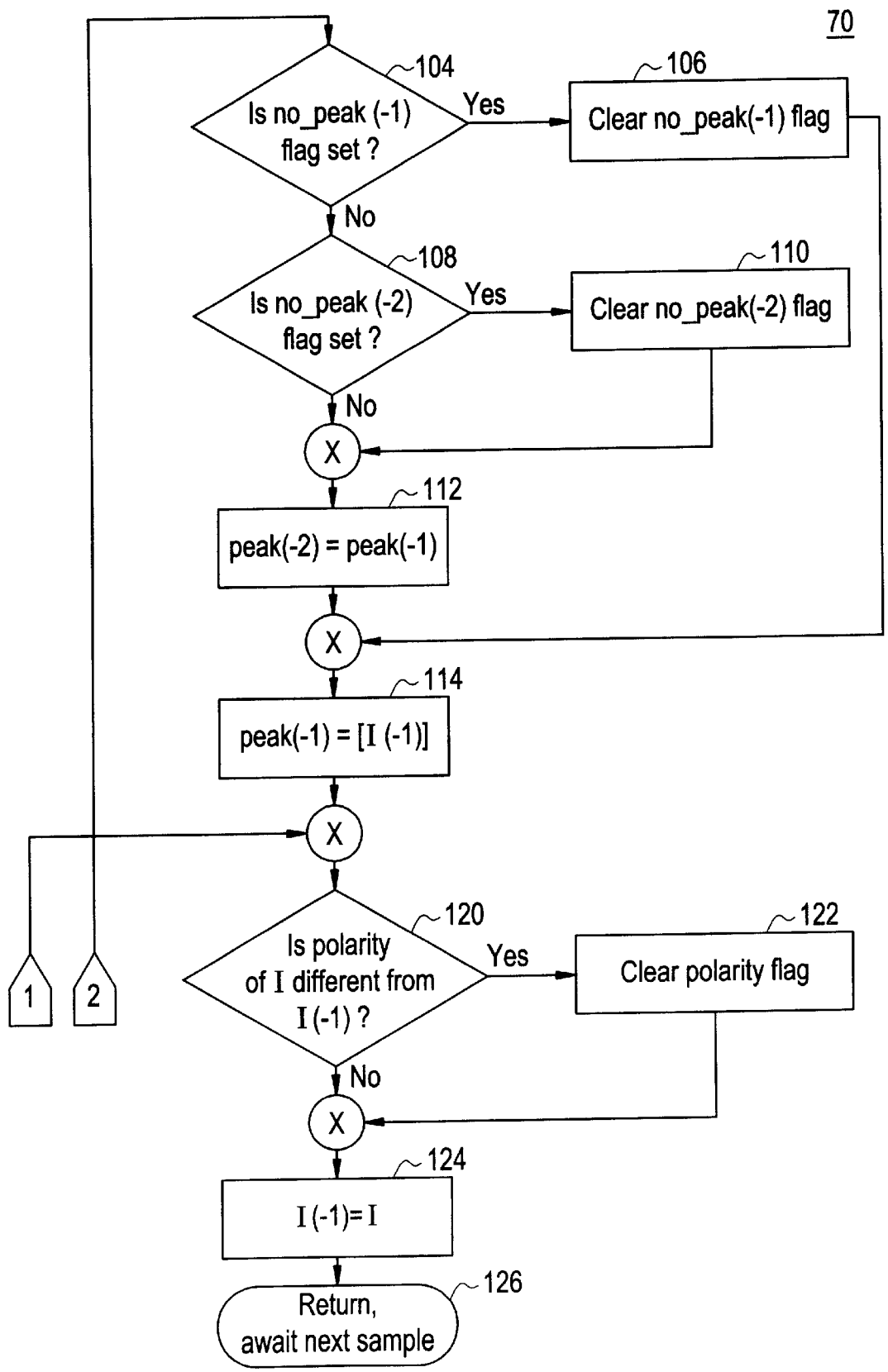

The algorithmic approach of the present invention will now be described in more detail with reference to FIG. 3. FIG. 3 depicts algorithmic procedure 70, which is repeated for each current sample. The frequency of the current samples is a function of the speed of the current sensors, the speed of the A/D converter, the processing capabilities of the microcontroller and other operational variations. A current sample I (obtained from current sensors 36 and preferably processed by A/D converter) is presented in step 72 to the microcontroller 44 and related software encompassed by ROM 48, RAM 46 and EEPROM 50. In the first algorithm, generally denoted by reference numeral 74, bolted faults are detected quickly. At block 76, the first algorithm effectuates a comparison between the absolute value of the current ($|I|$) and a threshold value A determined by the following equation:

$$A = 2 I_{SP} 2^{1/2} (2 \ X \ RMS \ I_{SP}) \qquad (1),$$

where $I_{sp}$ is the instantaneous set point limit. Note that the instantaneous set point is determined by the industry's standards employed and the particular load to be protected. Thus, if $$|I| > A, \qquad (2)$$

then the fault current generally will exceed the root mean square (RMS) instantaneous fault current in the steady state even if the instantaneous current of the first half cycle is inflated due to the asymmetry DC offset.

Preferably, to prevent nuisance trips caused by momentary faults or other transient current glitches, the unit will not trip after a single current value exceeding A. Rather to distinguish between a true fault current and a transient glitch occurs, multiple consecutive current samples are compared to A. The number of samples required to trip, n, is predetermined such that n is a function of the sampling rate for the trip unit and should be selected to span approximately 1–2 milliseconds.

If $|I|$ is greater than A, the algorithmic flow proceeds from block 76 to block 80, where the value of the total consecutive trip counts is increased by one. The next block 82 compares n(tc) with n. If n is exceeded, then microcontroller 44 will direct a trip signal via output 54 to trip module 56 to open the circuit breaker, indicated at block 200 of flow chart 70. When n is not exceeded by n(tc), the process continues as shown toward the second algorithm generally denoted in the flow chart as algorithm 90, discussed further herein.

If $|I|$ is not greater than A, the algorithm proceeds to block 78 of the flow chart, where n(tc) is reset to zero. Generally, if $|I|$ is greater than A less than n times, and the second algorithm has not caused a trip, the spike is due to a momentary fault. Comparison of consecutive samples rather that a single sample aids in the prevention of nuisance tripping due to transient glitches.

Proceeding to the second algorithm, depicted by reference numeral 90, the peak-to-peak current (referenced as pk–pk in FIG. 3) is compared to the RMS instantaneous fault current set point, $I_{sp}$. The detection of two peaks accurately takes into effect the potential reduction of a fault current in a subsequent half cycle due to, for example, opening of a downstream circuit breaker or the passing of the asymmetry phenomenon. Generally, the second algorithm determines the sum of an earlier stored or preceding peak and the average value of the most recent peak and the absolute value of the current of the present sample ($|I|$). That sum is compared to a value equal to twice the RMS value of the instantaneous set point ($2 \ I_{sp} \ 2^{1/2}$), and if the sum is greater, a fault condition will accurately be detected and the breaker will trip.

Certain variables for the second algorithm are required to determine the two peaks required. The sample processed at a given point in time is represented by I. The previous sample processed is represented by I(−1). At a startup condition, either upon initial operation of the system, after a trip caused by the first or second algorithm or after a manual resetting of the system, the values for the most recent peak current value peak(−1) and the preceding peak current value peak(−2) have yet to be determined and/or stored in memory. Thus, flags are correlated with the existence of a stored value for the peak. These flags are represented herein in the negative, where a flag is set if a certain peak value is non-existent, as $no_{13}$ peak(−1) and $no_{13}$ peak(−2). If $no_{13}$ peak(−1) has been set, then a peak(−1) must be determined and stored. Similarly, if $no_{13}$ peak(−2) has been set, then a peak(−2) must be determined and stored. Additionally, as described in more detail herein, a polarity flag is used to determine whether the half-cycle has changed, i.e., the polarity of the present sample I differs from the polarity of the previous sample I(−1). The polarity flag remains unset (cleared) until a peak(−1) has been determined. Furthermore, I(−1) is yet to be determined at an initial startup condition.

Therefore, for a first sample at a startup condition, the following variable values exist:

I=present current value;

I(−1)=(to be determined);

$no_{13}$ peak(−1)=set;

$no_{13}$ peak(−2)=set;

peak(−1)=(to be determined);

peak(−2)=(to be determined); and polarity flag=cleared.

Block 92 determines whether $no_{13}$ peak(−2) has been set. At a startup condition continuing from a negative response in block 82 (i.e., no trip because the absolute value of the current has exceeded twice the RMS instantaneous fault set point a single time rather than n times) or block 78 (i.e., no trip because the absolute value of the current has not exceeded twice the RMS instantaneous fault set point, block 76, and the trip count n(tc) remains zero at block 78), $no_{13}$ peak(−2) is set. The query of block 92 is answered affirmatively, whereby the algorithm proceeds to block 100 where the process for storing peak(−1) and peak(−2) with the subsequent samples is commenced.

Block 100 determines whether the polarity flag has been set. For an initial sample, the polarity flag will not be set, as there has not been a peak(−1) determination, and the algorithm will flow to block 102. The polarity flag will set when a peak(−1) is ascertained and stored, as described further herein, and it will return to the unset state when a polarity change is detected by polarity sensor 32. If it is determined by block 100 that a polarity flag has been set, the algorithm will proceed to block 120. For the algorithmic processing of an initial sample, block 102 determines whether the absolute value of the current of the present sample |I| is greater than the absolute value of the current of the previous sample |(−1)|:

$$|I|>|I(-1)| \qquad (3)$$

For a first sample where I(−1) does not exist, |I| will be presumably greater than |I(−1)| and the algorithm will continue from block 102 to block 120. At block 120, a determination is made as to whether the polarity of I is different from the polarity of I(−1). However with an initial sample I, I(−1) does not exist thus the negative response to the query of block 120 occurs. Continuing from a negative response in block 120, the algorithm proceeds to block 124 where the previous sample I(−1) is set to equal the current value of the present sample I. At block 126, the flow returns to step 72 whereupon processing of a new sample I commences. In processing the immediately subsequent sample, the $no_{13}$ peak(−1) and $no_{13}$ peak(−2) flags are set, the polarity flag is clear, and I(−1) has been set (the value of I for the previous sample). As with all samples, the flow chart proceeds through the first algorithm 74 as described previously. If the trip count does not exceed n, or if |I| is less than A, the flow returns to the second algorithm. With the second sample, the query of block 92 is again answered affirmatively and the query of block 100 is again answered negatively.

Proceeding to block 102, the algorithmic scheme differs from the initial sample, as there is a value for I(−1). If the absolute value of the current of the present sample |I| exceeds the absolute value of the current of the previous sample, |I(−1)|, the flow proceeds to block 120. At block 120, the polarities of the present sample and previous sample are compared.

If the polarity of I is different from the polarity of the previous sample I(−1), the polarity flag will be cleared at block 122 (however, under startup conditions this step is redundant as the polarity flag has not been set) and the flow will proceed to block 124. At block 124, the value of I(−1) is set to the present sample and the previous I(−1) is cleared. If, at block 120, the polarity of I and I(−1) are the same, the flow will proceed directly to block 124 and the new I(−1) will be set to the present I.

If at block 102 the absolute value of the current for the sample is less than or equal to the absolute value of the current for the previous sample, the flow will proceed to determine peak(−1), beginning at block 104. At block 104, it is determined whether a peak(−1) has been set. In the algorithmic flow depicted, this is accomplished by the $no_{13}$ peak(−1) flag, which indicates the existence of a value for peak(−1). At initialization, $no_{13}$ peak(−1) flag is set, indicating a lack of a value for peak(−1). Thus, the first time a subsequent sample has a lower current than the previous sample, the flow will proceed to block 106, where $no_{13}$ peak(−1) flag is cleared (as the determination of a value for peak(−1) will occur in the next step). Proceeding from block 106 to block 114, a peak(−1) is set, whereby peak(−1)=|I(−1)|. Further, the polarity flag is set for the polarity of the current at the present half-cycle. For subsequent samples, no peak measurements take place until the polarity changes and the polarity flag is cleared (blocks 120 and 122).

The next step, block 120 (which flows from block 100, block 102, and block 114) determines whether the polarity of the present sample |I| is different from the polarity of the previous sample I(−1). If so, the algorithmic flow proceeds to block 122, where the polarity flag is cleared and then the present current value I replaces the previous I(−1) (block 124). When the polarity of I is the same as the polarity of I(−1), the algorithmic flow proceeds directly to block 124 where the present I substitutes the previous I(−1).

Thus, at this point, in the algorithmic flow peak(−1) has been determined, $no_{13}$ peak(−1) flag is cleared, the polarity flag is set (as peak(−1) is set), peak(−2) has not been determined, and the $no_{13}$ peak(−2) flag remains set. The next sample proceeds from block 72 through the first algorithm, where upon the breaker will trip if n(TC) exceeds n. If not, the flow proceeds to block 92. As previously mentioned, the $no_{13}$ peak(−2) flag is still set as peak(−2) has yet to be determined thus the flow proceeds to block 100 where it is determined that the polarity flag has been set. Block 102 (containing equation 3) is bypassed, and the flow proceeds to block 120 where it is determined whether the polarity has changed from the previous sample I(−1) to the present sample I. Another [peak(−1)] cannot be determined until the phase current polarity changes. When this occurs, the polarity flag is cleared (block 122), I(−1) is set to the value of the present I (block 124) and the flow awaits the next sample (block 126).

Thus, when the polarity changes and a peak(−2) has yet to be set, the conditions are as follows:

=present current value
(−1)=(determined);
$no_{13}$ peak(−1)=cleared
$no_{13}$ peak(−2)=set;
peak(−1)=(determined);
peak(−2)=(to be determined); and
polarity flag=cleared.

Proceeding from block 126 to block 72, a new sample I is processed through the first algorithm. If the breaker has not tripped (i.e. |I| is not greater than twice the RMS instantaneous fault set point, or the trip count is not greater than n), the flow proceeds to block 92 of the second algorithm. Again if the query of block 92 is answered affirmatively (as is the case when a peak(−2) has yet to be set), then the flow proceeds to block 100. At block 100, the polarity flag has been cleared, thus the flow proceeds to block 102 where the comparison of equation 3 is effectuated. If |I| is greater than |I(−1)|, the algorithmic flow proceeds from block 102 to block 120 and the phase current polarity of the present sample I is compared with the polarity of the previous sample I(−1) (block 120), as previously described. If |I| is less than or equal to |I(−1)|, the algorithmic flow proceeds to set peak(−2) and reset peak(−1). Thus, proceeding from block 102 to block 104, a determination is made as to whether the $no_{13}$ peak(−1) flag is set. At this point, the $no_{13}$ peak(−1) flag is cleared (as peak(−1) is set) thus block 104 is answered negatively, and the flow proceeds to block 108. At block 108, a determination is made as to whether the $no_{13}$ peak(−2) flag is set. At this point, the $no_{13}$ peak(−2) flag is set (as peak(−2) has not been set) thus block 108 is answered affirmatively and the flow proceeds to block 110 whereupon the $no_{13}$ peak(−2) flag is cleared (since peak(−2) will be set). Proceeding from block 110 to block 112, peak(−2) is set to equal the present peak(−1). A new peak (−1) is set to equal the absolute value of the current of the previous sample and the polarity flag is set at block 114.

Proceeding from block 114 to block 120, the present phase current polarity is compared to that of the previous sample as described above. No peak measurement will occur until the phase current polarity changes and the polarity flag is cleared at block 122. Proceeding from block 122 (if the phase current polarity changed from the previous sample) or block 120 (if the phase current polarity did not change), the previous current sample I(−1) is reset to the present current sample I (block 124) and the algorithm is set to await the next sample (block 126). Thus, when the polarity changes and a peak(−2) has been set, the conditions are as follows:

I=present current value;
I(−1)=determined;
$no_{13}$ peak(−1) flag=cleared;
$no_{13}$ peak(−2) flag=cleared;
peak(−1)=(determined);
peak(−2)=(determined); and
polarity flag=cleared.

At this stage, both peaks have been set and the second algorithm is ready to calculate the peak-to-peak current based upon peak(−1), peak(−2) and |I|. The peak-to-peak current may then be compared with the instantaneous set point or a factor thereof.

Proceeding again from block 126 to block 72, a new current sample |I| is processed. If the breaker is not tripped due to the exceeded trip count limits at block 82 of the first algorithm, sample I is processed in the second algorithm starting at block 92. A negative response to the query in block 92 (i.e. $no_{13}$ peak(−2) flag is cleared) directs the flow to block 94, where the peak-to-peak current may be determined by the following equation:

$$pk\text{--}pk=[|I|+peak(-2)]/2+peak(-1). \quad (4)$$

This calculation is repeated for every current sample where peak(−1) and a peak(−2) both exist, or block 92 is answered negatively. The value obtained, pk–pk, is compared at block 96 to two times the RMS instantaneous set point of the protected device or breaker as follows:

$$pk\text{--}pk > 2 \times 2^{1/2} I_{SP,} \quad (5)$$

where $2^{1/2}I_{SP}$ represents the RMS instantaneous fault current set point.

If pk–pk exceeds two times the RMS instantaneous set point, the breaker will trip as indicated at block 200. This is appropriate, as it would indicate that the present current I is high enough that, when averaged with the previous peak ([|I|+peak(−2)]/2) and that average summed with the most recent peak [peak(−1)], two times the RMS instantaneous set point is exceeded.

When pk–pk is less than or equal to two times the RMS instantaneous set point, there will be no trip and the second algorithm will proceed to block 100. If a new peak(−1) has been determined in the present half-cycle, the polarity flag will be set and an affirmative response to the query in block 100 will direct the algorithmic flow to block 120. No new peaks will be stored until a polarity change is detected (or, upon the occurrence of a new half-cycle) at block 120 and the polarity is cleared at block 122. For subsequent samples within a new half-cycle, i.e., the polarity flag is cleared, a negative response to the query of block 100 will result, directing the algorithmic flow to check for new prospective peak values to store, as described above.

It is understood by one skilled in the art that the algorithmic flow relayed herein may be modified by known techniques. For example, algorithms and or subroutines may be appended to compensate for any errors that occur in this detection method due to the sampling error. Similarly, an analog circuit approach may substitute the algorithm for the digitally sampled system described herein. Such an analog circuit, for example, may use multiple or linked peak detecting circuits that would implement the same algorithms.

To illustrate the operation of the algorithmic approach described herein, examples will be described and the processing steps delineated. Consider the case of a 250 ampere breaker fed from a 400 ampere breaker with both breakers set at an instantaneous fault of ten times the rated current. If this system is operating with no fault for a period of time equivalent to at least two half-cycles, peak(−1) and peak(−2) values will be set and equations 4 and 5 of blocks 94 and 96 respectively will be calculated. If, for example, during the first half-cycle, a 4,100 ampere fault occurs with a 1.5 asymmetry, then the system will "see" a fault in excess of 6,000 ampere. If such fault continues for n samples spanning, for example, 1 millisecond (i.e. not a mere "transient glitch"), the downstream breaker rated at 250 ampere will trip during the first half-cycle as the absolute value of the current (greater than 6,000 ampere RMS) exceeds two times the set point (i.e., 5,000 ampere). This is accomplished by the first algorithm depicted generally at 74. However note that the upstream breaker rated 400 ampere will not trip, as the absolute value of the current does not exceed two times the set point (i.e., 8,000 ampere). Note that the past electronic instantaneous circuit protection approaches would have caused both breakers to open immediately, which would create a nuisance trip for other breakers or loads fed from the 400 ampere breaker.

If the 4,100 ampere fault is not limited, during the next half-cycle another peak will be stored as peak(−1) and the old peak(−1) will be stored as peak(−2). In the processing of the immediately subsequent sample I, if the fault is still present (or a value of I is high enough to inflate the pk–pk value above two times the RMS setting, or 8,000 ampere for the upstream breakers), the pk–pk value in equation 4 (block 94) will exceed two times the RMS instantaneous fault set point for the upstream 400 ampere breaker.

After the first half-cycle, the asymmetry phenomenon will disappear. Thus, peak(−2) (the first peak seen) will equal 6,150 ampere and peak(−1) and absolute value of |I| will equal 4,100 ampere. Performing the calculation, $$pk\text{–}pk = [(6{,}150 + 4{,}100)/2 + 4{,}100] = 9{,}225 \text{ ampere},$$

which will trip the 400 ampere breaker (9,225>2×400×10).

If instead a 4,100 ampere fault occurs without asymmetry (or, a 1.0 asymmetry value) on the first half-cycle, neither the downstream 250 ampere breaker nor the upstream 400 ampere breaker will trip after the first algorithm. However, after two half-cycles, if the fault is still present, [peak(−1)], [peak(−2)] and |I| will equal approximately 4,100 ampere, and pk–pk will equal 8,200 ampere thus even without asymmetry, both breakers will correctly trip a 4,100 ampere fault.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of protection in an electronic trip unit, comprising:
   sensing an electrical signal of a current flow to provide a present current value of said current flow;
   comparing the absolute value of said present current value and a first current threshold, said first current threshold indicating a product of a first predetermined value and an instantaneous fault current set point; and
   comparing a multiple peak sum and a second current threshold, said second current threshold indicating a product of a second predetermined value and said instantaneous fault current set point.

2. The method as in claim 1, further comprising:
   generating a signal when the absolute value of said present current value is equal to or greater than said first current threshold.

3. The method as in claim 2, further comprising:
   commencing a tally upon generation of said signal;
   incrementing said tally if an absolute value of a subsequent current value exceeds said first current threshold;
   generating a trip signal when said tally reaches a tally limit; and
   clearing said tally if the absolute value of said subsequent current value does not exceed said first current threshold.

4. The method as in claim 3 wherein said tally limit is selected such that at least 1 millisecond of said electrical signal of a current flow is sensed.

5. The method as in claim 3 wherein said tally limit is selected such that at least 1 millisecond and no more than 2 milliseconds of said electrical signal of a current flow is sensed.

6. The method of claim 1 wherein said first predetermined value is equal to two.

7. The method of claim 2 wherein said instantaneous fault current set point is a route mean square instantaneous set point.

8. The method as in claim 1, said comparing said multiple peak sum and said second current threshold comprising:
   storing a most recent peak current value;
   storing a preceding peak current value;
   calculating a peak sum by adding said most recent peak current value and an average of the absolute value of said present current value and said preceding peak current value;
   comparing said peak sum to said second current threshold; and
   generating a trip signal when said peak sum exceeds said second current threshold.

9. The method as in claim 8, further comprising:
   sensing said electrical signal for polarity signals indicative of a positive polarity half-cycle or a negative polarity half-cycle of the electrical signal; and
   comparing the absolute value of said present current value with an absolute value of a preceding current value within a half-cycle, and when the absolute value of said preceding current value is equal to or greater than the absolute value of said present current value within a half cycle, discarding said preceding peak current value, storing said most recent peak current value as said preceding peak current value and storing the absolute value of said preceding current value as said most recent peak current value.

10. The method of claim 1 wherein said second predetermined value is equal to two.

11. The method of claim 1 wherein said instantaneous fault current set point is a route mean square instantaneous set point.

12. The method of claim 9 further comprising:
    setting a first flag indicative of the non-existence of a most recent peak current value;
    setting a second flag indicative of the non-existence of a preceding peak current value;
    clearing said first flag when a most recent peak current value is obtained;
    clearing said second flag when a preceding peak current value is obtained;
    whereby the step of comparing said peak sum to a second threshold value is performed only when said second flag is cleared.

13. An electronic trip unit comprising:
    a current sensor for providing a current value indicative of a present current; and
    a microcontroller configured to compare an absolute value of said present current value and a first current threshold and to compare a multiple peak sum and a second current threshold, said first current threshold indicating a product of a first predetermined value and an instantaneous fault current set point, and said second current threshold indicating a product of a second predetermined value and said instantaneous fault current set point.

14. The electronic trip unit of claim 13, wherein said microcontroller generates a signal when the absolute value of said present current value is equal to or greater than said first current threshold.

15. The electronic trip unit of claim 14, further wherein:

a tally is commenced upon generation of said signal;

said tally being incremented if an absolute value of a subsequent current value exceeds said first current threshold;

a trip signal being generated when said tally reaches a predetermined tally limit; and said tally being cleared if the absolute value of said subsequent current value does not exceed said first current threshold.

16. The electronic trip unit as in claim 15 wherein said tally limit is selected such that at least 1 millisecond of said electrical signal of a current flow is sensed.

17. The electronic trip unit as in claim 13 wherein said tally limit is selected such that at least 1 millisecond and no more than 2 milliseconds of said electrical signal of a current flow is sensed.

18. The electronic trip unit of claim 13, wherein said microcontroller is further configured to:

store a most recent peak current value;

store a preceding peak current value;

calculate a peak sum by adding said most recent peak current value, and an average of the absolute value of said present current value and said preceding peak current value;

compare said peak sum to said second current threshold; and generate a trip signal when said peak sum exceeds said second current threshold.

19. The electronic trip unit of claim 18, wherein:

said electrical signal is further sensed for polarity signals indicative of a positive polarity half-cycle or negative polarity half-cycle of the electrical signal; and wherein said microcontroller is further configured to compare the absolute value of said present current value with an absolute value of a preceding current value within a half-cycle, and when the absolute value of said preceding current value is equal to or greater than the absolute value of said present current value within a half cycle, discard said preceding peak current value, store said most recent peak current value as said preceding peak current value and store the absolute value of said preceding current value as said most recent peak current value.

20. The electronic trip unit of claim 18, further wherein:

a first flag is set indicative of the non-existence of a most recent peak current value;

a second flag is set indicative of the non-existence of a preceding peak current value;

said first flag being cleared when a most recent peak current value is obtained;

said second flag being cleared when a preceding peak current value is obtained;

said peak sum being compared to a second threshold value only when said second flag is cleared.

21. A protected electrical system comprising:

an alternating current power source;

an electrical load;

a circuit breaker electrically disposed between said alternating current power source and said electrical load; and an electronic trip unit interfaced with said circuit breaker, wherein said electronic trip unit includes a current sensor for periodically providing a current value indicative of a present current and a microcontroller for performing an instantaneous current comparison between an absolute value of said present current value and a first current threshold and for performing a peak-to-peak current comparison between a multiple peak sum and a second current threshold, said first current threshold indicating a product of a first predetermined value and a root mean square instantaneous fault current set point, and said second current threshold indicating a product of a second predetermined value and said root mean square instantaneous fault current set point.

22. A protected electrical system for protecting an electrical load energized by an alternating current power source comprising:

a circuit breaker electrically disposed between said alternating current power source and said electrical load; and rewritten in independent form including all of the limitations of the base claim and any intervening claims. In addition, the Examiner has objected to the drawings.

23. An electronic trip unit comprising:

a sensing means for sampling a current flow and providing a current value;

a first comparison means for comparing said present current value to a first current threshold;

a second comparison means for obtaining a peak-to-peak current value to a second current threshold; and a means for generating a signal indicative of said present current value exceeding said first current threshold or indicative of said peak-to-peak current value exceeding said second current threshold.

* * * * *